United States Patent [19]
Palermo

[11] 3,895,348
[45] July 15, 1975

[54] VEHICLE MOUNTED WARNING DEVICE

[76] Inventor: Ambrose Palermo, 1853 N.E. 161st St., North Miami Beach, Fla. 33162

[22] Filed: Sept. 17, 1973

[21] Appl. No.: 397,808

[52] U.S. Cl. .............................. 340/87; 116/173
[51] Int. Cl. ........................................ B60q 1/00
[58] Field of Search ............... 340/87, 84; 116/173

[56] References Cited
UNITED STATES PATENTS
| | | | |
|---|---|---|---|
| 2,324,614 | 7/1943 | Dalton | 116/173 X |
| 3,117,549 | 1/1964 | Ripepe | 116/173 X |
| 3,143,722 | 8/1964 | Murch | 340/87 X |
| 3,242,901 | 3/1966 | Olson | 116/173 |

FOREIGN PATENTS OR APPLICATIONS
6,709,250  1/1969  Netherlands.......................... 340/87

Primary Examiner—Donald J. Yusko

[57] ABSTRACT

A warning device intended for mounting in a substantially concealed position on a vehicle and operable in a telescopic manner to provide above the cab portion of the vehicle a visual warning light, with a visual warning pennant adapted to be mounted on the telescopic member beneath the visual warning light for greater visibility during the daylight hours.

2 Claims, 4 Drawing Figures

PATENTED JUL 15 1975 3,895,348

VEHICLE MOUNTED WARNING DEVICE

BACKGROUND OF THE INVENTION

1. Field of the Invention

This invention relates generally to warning devices designed for use with stalled or parked vehicles on or adjacent a thoroughfare, such as an automobile, and relates more particularly to a novel and improved emergency warning device disposed in a permanent concealed manner in the automobile and adapted for quick and easy disposition into an operative position at an elevated level above the height of the automobile passenger compartment so as to be visual in all directions both during the night hours and during the daylight hours thus displaying a warning to passersby on the thoroughfare near the vehicle.

2. Description of the Prior Art

A stationary vehicle, whether disabled on a thoroughfare or parked adjacent to a modern high-speed thoroughfare, constitutes a serious hazard both to the occupants of the vehicle as well as the occupants of approaching vehicles and other passersby on the thoroughfare due to the increased possibility of a collision or other accident either with or caused by the stalled or parked vehicle. Due to the exceptionally high speeds of vehicles on modern thoroughfares, a visual warning of a stalled or parked vehicle to oncoming traffic is necessitated which can be readily seen and quickly understood from a considerable distance by approaching vehicles, such visibility being required both during night time and daytime hours.

On modern highways and expressways, due to the high speeds thereon, many injuries have occurred both to persons and property with several lives being lost each year caused by vehicles traveling at a high rate of speed striking stationary vehicles which are stalled or parked either on or adjacent to the highway, the accidents being caused by the inability of the driver of the approaching vehicle to see the stationary vehicle at a sufficient distance and with sufficient warning to avoid the collision. Therefore, it is highly desirable to provide a warning signal which can be quickly displayed and is of a character to be clearly understood and visible at a distance from the vehicle both at night and during the day.

In view of the seriousness of this problem, and in order to give warning of this hazard, various signaling devices are currently available which rely upon light of one kind or another, such as flares, revolving lights, blinking lights, etc. Further, various emergency vehicle signs for giving warning to the passersby have been disclosed in the past.

Considering first the prior art devices which rely upon light, they normally suffer from lack of reliability as they require batteries or other power sources which must constantly be checked, replaced, or recharged when in storage to assure that the device is ready for any emergency. As is quite common, this is often neglected with the result being that in an emergency the vehicle is left with no warning signal. Further, other devices are disclosed of a type adapted to be stored in the vehicle in some convenient location, and then when required removed from its storage position and somehow clamped onto the vehicle, such as by a suction cup or the like, with an extension cord adapted to be plugged into the cigarette lighter socket provided normally in most vehicles. This device is not well suited for the purpose as it is only elevated a slight distance above any mounting surface on which it is placed, this being a relatively low position on modern day automobiles which are constructed low to the ground such that insufficient warning is provided to oncoming traffic. Further, such devices require interpretation on the part of the oncoming traffic as, for example, when they are mounted on the vehicle passenger compartment they give the appearance of some type of emergency vehicle or the like when first viewed by the oncoming traffic, this requiring the oncoming driver to interpret exactly what is meant by the light before taking any positive action relative thereto. Thus, not only does the oncoming traffic see the vehicle provided with such warning device at the very last possible opportunity, but the driver is then further confused as to exactly what the warning means thus losing further time in requiring mental interpretation of the warning before positive action on the part of the driver of the oncoming vehicle may be iniated.

Further, as to this requirement of interpretation by the driver of an oncoming vehicle, it must be appreciated that light signals are frequently encountered for different purposes during everyday driving of a vehicle such as stop lights, blinkers, turn signal indicator lights, police cars, ambulances, tow trucks, road repair areas, construction work areas, etc., so that when a driver sees a light signal he must first determine what it signals and means before taking the appropriate countermeasure. This interpretive delay regarding the meaning of the signal may mean the difference between the occurence or avoidance of an accident.

As to those emergency vehicle devices disclosed in the prior art utilizing signs and printed warnings of different types, such normally utilize arrangements complicated in construction with the associated difficulties of manufacture and later use by the vehicle occupant being of such a nature as to be too much of a bother to use, and are normally not sufficiently compact for storage in or proper attachment to a vehicle such that, by themselves, they failed generally to communicate to the passersby on the thoroughfare a readily understandable warning requiring no interpretation by the driver of the oncoming vehicle.

Prior art devices thus suffer many problems and difficulties in attempting to solve this serious problem of warning other vehicles on high speed thoroughfares of a parked or stalled vehicle, and have yet failed to produce a truly reliable and effective warning device which is inexpensive in structure, which may be permanently attached to a vehicle in an out of the way position so as to form an integral part of the vehicle for simple and fast use in emergencies, and which may be readily used in time of emergency without requiring any special skills or expertise by the vehicle operator or passengers in the vehicle.

SUMMARY OF THE INVENTION

The present invention remedies and overcomes all of the foregoing deficiencies and disadvantages of presently available and prior art devices. It provides the occupants of a motor vehicle with a means of warning oncoming traffic and passersby of the stalled or parked vehicle during both daylight and night time hours.

It is a feature of the present invention to provide a warning signal for automobiles which may be stalled or parked on or near streets and modern high-speed expressways, such as on highway shoulders or highway emergency parking strips, which is intended to be permanently mounted in an appropriate manner to the vehicle in a substantially concealed location when not in use and which is readily extendable for usage to a position above the height of the vehicle passenger compartment to expose both an electric lamp and a pennant providing maximum daylight and night time visibility so that it may be readily observed at a great distance from the vehicle by daylight or at night time by the driver of an oncoming approaching vehicle on the thoroughfare. The device is preferably attached to the vehicle on either the front or rear fender portions thereof in a substantially vertical manner utilizing a minimum of space not otherwise required for use in the vehicle, the device being readily telescopically extended for visibility in all directions about the vehicle.

A further feature of the invention provides an emergency warning device including an electric lamp electrically connectable to the flashing light system of a motor vehicle and operable in a manner to flash with such flashing lights to warn oncoming traffic, the light being mounted on a telescoping mast adapted to support the light at an operable position above the level of the vehicle passenger compartment to be visible in all directions about the vehicle.

Still a further feature of the present invention provides an emergency warning device as an integral part of the vehicle such that the same is always immediately available for operative use to warn oncoming traffic without requiring any special tools or attachments to be made thereto.

Yet still a further feature of the present invention provides an emergency warning device adapted to have a warning pennant or the like attached thereto and raised to a position substantially above the elevation of the passenger compartment to be visible to oncoming traffic in all directions, such pennant being color coded to indicate the type of the emergency, whether assistance is required, or other such information as may be desired.

Yet still a further feature of the invention is to provide a warning device which may be easily and inexpensively manufactured from readily available components and materials, may be readily attached as an integral part of the vehicle in and out of the way position, and which is capable of quick application and utilization without any special instructions to the vehicle occupants or vehicle driver in order to warn oncoming traffic or passersby of the stalled or parked vehicle.

Still a further feature of the invention is to provide a warning device designed to be easily and quickly attached in a substantially concealed manner to an automobile, the entire installation being quite simple requiring only tools ordinarily available around the home with no special tools or skills being required.

The provision of a vehicle mounted warning device, such as briefly outlined above, and possessing the stated advantages, constitutes the principal features of the present invention. The provision of a warning device which is relatively simple in its construction and which therefore may be readily manufactured at a relatively low cost and by simple manufacturing methods; one which utilizes a minimum of moving parts and which therefore is unlikely to get out of order; one which is rugged and durable and which therefore may be guaranteed by the manufacturer to withstand the intended usage; one which is aesthetically pleasing and refined in appearance so as to not to detract from the overall appearance of the vehicle; one which may, in its entirety, be manufactured and installed as part of the original equipment of the vehicle, or which may be attached to the vehicle later as an accessory item; and one which, otherwise, is well adapted to perform the services required of it, are further desirable features which have been borne in mind in the production and development of the present invention.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same.

DESCRIPTION OF THE PREFERRED EMBODIMENT

Figure 1:
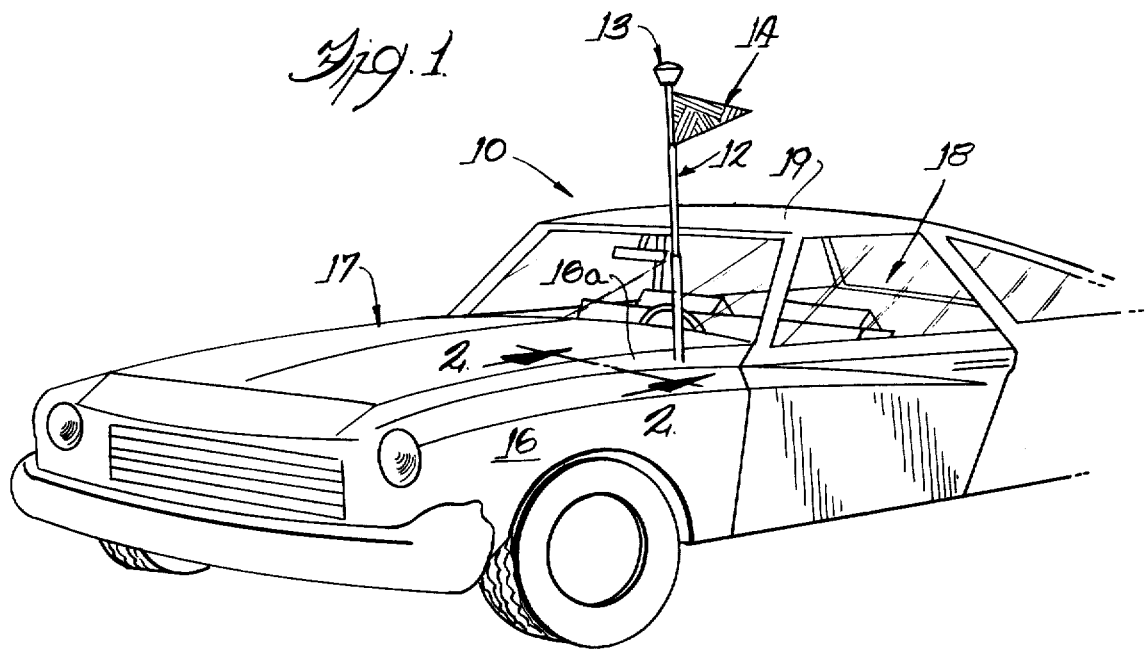
FIG. 1 is a perspective view of a front portion of an automobile having a warning device constructed in accordance with the present invention mounted thereon and extended to its operable position at an elevation above the passenger compartment.
Figure 2:
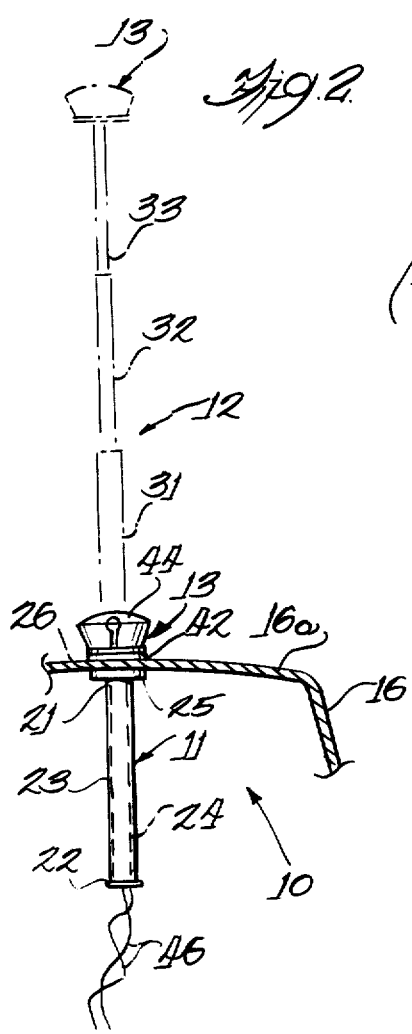
FIG. 2 is a front elevational view of the warning device mounted to a vehicle body with the extended position thereof being illustrated in phantom configuration.
Figure 3:
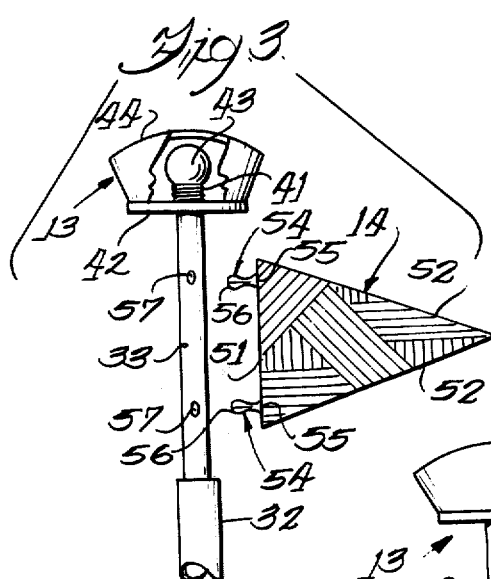
FIG. 3 is a front elevational view of the upper section of the warning device and disclosing a pennant in position to be attached thereto.

Referring now to the drawings there is disclosed a preferred form of a warning device constructed in accordance with the present invention and intended for mounting in a substantially concealed position on a vehicle, the warning device being designated in its entirety by the reference numeral 10 and being comprised of a support tube 11, a telescoping mast 12, an electric lamp 13 mounted on the upper portion of the mast, and a pennant 14 intended to be detachably attached to the upper portion of the mast. The warning device 10 is shown mounted in a desirable position on a horizontal portion of the front fender 16 of a vehicle 17 having a passenger compartment 18 with a roof surface 19 thereover being the highest elevation on the vehicle 17.

The support tube 11 is of an elongated hollow open ended cylindrical member having a top end 21, a bottom end 22, and cylindrical side walls 23 extending therebetween and defining therein an elongated axially extending compartment 24 opening the the ends 21 and 22 respectively. The top end 21 is provided with suitable mounting means, such as designated by numeral 25, adapted to mount the support tube 11 in a substantially vertical position beneath the horizontal portion 16a of fender 16 in axial alignment with an opening 26 provided therethrough. The support tube 11 may be manufactured out of metal, hard rubber, plastic, or any other suitable satisfactory material, with the preferred embodiment utilizing metal tubing to insure a long life for the device.

The telescoping mast 12 consists of three mast sections 31, 32 and 33, section 31 being the largest in diameter and having an exterior diameter of a size to be telescopically received within compartment 24, section 32 being telescopically received within section 31, and section 33 being telescopically received within section 32, the section 33 defining a signal carrying section having electric lamp 32 connected thereto with pennant 14 adapted to be connected thereto. The sections 31–33 are each of an elongated hollow cylindrical configuration and are constructed and assembled in the conventional manner so as to retain any desired telescopic position at which they may be set by an individual. The mast sections 31–33 may be manufactured out of metal, hard rubber, plastic, or any other suitable satisfactory material providing an aesthetically pleasing and refined appearance, with a preferred embodiment being the utilization of chrome-plated metal to match with the chrome trim found on most automobiles.

The electric lamp 13 is mounted in any suitable manner to the top of upper mast section 33, such as by being threadedly received thereon, welded thereto, or the like, with the electric lamp including a conventional threaded type lamp socket 41 disposed centrally of lamp base 42 and being supplied with a high intensity type of electric light bulb 43 threadedly received therein. Detachably secured to the base 42 in any suitable manner is a dome shaped light transmitting cover 44 of an aesthetically pleasing design and which completely covers the light bulb 43 and socket 41 to protect the same from the weather elements. The cover 44 may be of any desired configuration or color, with a preferred color being either amber or red which are recognized as emergency warning signals throughout the country. Further, the cover 44 may be manufactured of any suitable satisfactory material having high light transmitting characteristics, with a translucent acrylic cover being preferred. The lamp socket 41 is provided with a pair of suitably insulated electrical wires 46 which extend through the mast 12 and support tube 11 and are adapted to be connected in an electrically parallel circuit arrangement with the flasher light circuit of the motor vehicle such that the lamp 13 will flash in conjunction with the intermittent flashings of the other emergency lights on the vehicle, such as the emergency flashing of the front and rear turn signals. Thus, lamp 13 will immediately begin flashing simultaneously with the operation of the emergency flashing of the turn signals of the automobile.

The pennant 14 may be manufactured out of a rigid material, such as metal, plastic, cardboard, or the like, or may be manufactured out of a flexible material, such as canvas, paper sheets, cloth, and the like, with the pennant in either case being colored or decorated in a manner having high reflective qualities for maximum visibility both during the day and night with the same reflecting the headlights of oncoming vehicles at night thus providing visibility at a great distance from the stalled or parked vehicle. Further, it is envisioned that a complete color code system may be developed with pennants of different colors signaling different warnings to the oncoming traffic, such as whether the stalled vehicle requires assistance or whether it is merely a parked vehicle along side a highway providing the operator with some needed rest, at which case oncoming traffic would not be prone to stop and offer assistance or to summon assistance which would not be required if the vehicle was merely parked for rest purposes. As disclosed, the pennant 14 is of a triangular configuration having a base portion 51 and legs 52 extending outwardly therefrom. The base portion 51 is provided with a pair of longitudinally spaced members 54 each having one end 55 suitably fastened to the pennant 14 with the opposite end 56 projecting outwardly therefrom and being formed of a resilient material, such as plastic or the like, of a size and configuration to be detachably received in similarly spaced apart apertures 57 provided in upper mast section 33 in a manner to removably secure the pennant 14 to the mast 12. The members 54 are preferably of an elongated bifurcated shape permitting the ends 56 to be deflected inwardly toward each other upon insertion into an associated opening 57, with the diameter of the members 54 intermediate the ends 55 and 56 being of a reduced diameter to permit the expansion of the ends 56 after insertion into the associated opening 57 to thus retain the member 54 removably secured thereto.

Figure 4:
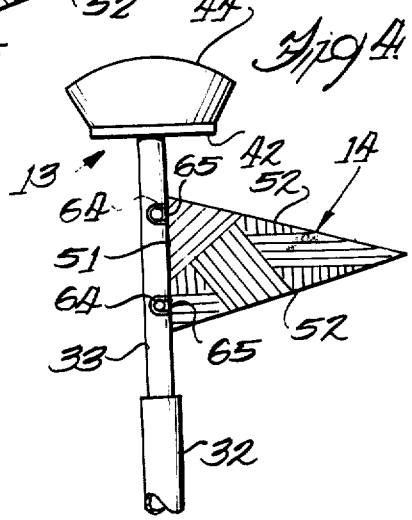
FIG. 4 is a front elevational view of the upper portion of the warning device similar to FIG. 3 and disclosing an alternative means for attaching the pennant thereto.

In FIG. 4 there is shown an alternative means of mounting a pennant 14 to the upper mast section 33, such pennant having a pair of longitudinally spaced loops 64 extending outwardly therefrom and of a size and configuration adapted to be detachably attached to a pair of similarly spaced laterally extending projections 65 on the upper mast section 33 in a manner to removably secure the pennant 14 to the mast 12. It is to be understood that the projections 65 are spring-loaded and depressable axially inwardly of the mast section 33 to permit the section 33 to be telescopically received within section 32, such projections 65 being biased outwardly by the springs in a conventional manner such that upon section 33 being telescoped outwardly of section 32, the projections 65 then automatically extend to their operative positions, with the same being manually depressed inwardly of the mast section when telescoping the section 33 into the section 32.

In operation, the mast 12 is extended to its telescoped position placing lamp 13 substantially above the roof surface 19 of the automobile 17, a suitable colored pennant 14 for the emergency or situation at hand is attached to the upper mast section 33, with the automobile emergency flasher lights being energized to effect the simultaneous flashing of the lamp 13 with the emergency lights on the vehicle, such as the flashing turn signals and the like. When the use of the emergency device has terminated, the pennant 14 is removed from the mast 12 with the mast being telescopically collapsed into the storage position with the base 42 of the lamp 13 disposed adjacent the exterior fender surface 16a, the pennant being conveniently stored in the automobile passenger compartment or trunk compartment with the automobile flasher lights being de-energized.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be restorted to without departing from the spirit of the invention, the scope of the novel concepts thereof, or the scope of the sub-joined claims.

Having thus described the invention, what is claimed is:

1. A warning device intended for permanent mounting on the body of a vehicle, such as an automobile, in a substantially concealed inoperative position and adapted for utilization in an operable position disposed at an elevation substantially higher than the top of the passenger compartment of the vehicle, comprising:

an upright longitudinally elongated hollow open ended cylindrical support tube having an open top end and an open bottom end, the top end adapted to be mounted to the body of the automobile below an exterior portion thereof and axially aligned with an opening provided therefor in the automobile body with the support tube positioned in a substantially vertical manner, the support tube having an elongated cylindrical compartment extending axially completely therethrough between the resepctive ends thereof;

mounting means associated with said support tube top end for affixing said tube to said vehicle body, said mounting means including a flat washer affixed to the tube top end concentric with the tube to define an annular shoulder thereabout for engaging the interior of the vehicle body to secure the tube thereto;

a telescopic mast axially positioned within the support tube and telescopic relative thereto between a retracted inoperative position in which it is completely concealed from sight within the support tube, and an operative display position in which it is extended telescopically from the support tube with the top end thereof projecting a substantial height above the automobile passenger compartment roof surface, the telescoping mast consisting of at least three longitudinally elongated hollow cylindrical mast sections each having a different interior and exterior diameter, the lower section having an exterior diameter of a size to be slidably telescopically received for reciprocal movement within the support tube compartment through the top end thereof, the intermediate section being of a diameter to be telescopically received within the lower section through its top end, and the upper section being of a diameter to be telescopically received within the intermediate section through its top end, the collapsed telescoped position of the sections all being completely contained within the support tube compartment in the inoperative position;

a disc shaped base mounted to the top end of the mast upper section normal to the axis of the mast, the base completely covering the vehicle body opening when resting on the vehicle body when the mast is in the collapsed inoperative position;

an electric lamp socket mounted centrally of the base and extending upwardly therefrom;

an electric lamp removably received in the socket for energization thereby to provide a visible warning light signal;

a light transmitting dome shaped transparent protective cover surrounding the lamp and socket and removably secured to the top surface of the base about the periphery thereof;

a pair of suitably insulated electrical wires attached to the socket and passing downwardly therefrom through all of the mast section and through the supporting tube to be connected to the electrical circuit of the vehicle to permit selective energization and de-energization of the lamp;

a rigid triangularly shaped pennant signaling member having a base edge and an apex and forming a visible signal to be detachably attached along its base edge to the side wall of the upper mast section and extend laterally outwardly therefrom for visibility to oncoming traffic approaching the vehicle;

a pair of longitudinally spaced apart parallelly aligned radially disposed openings extending through the side wall of the upper mast section and opening into the hollow interior thereof; and a pair of identical members affixed to the opposite ends of the pennant base edge and projecting outwardly therefrom in the plane of the pennant and normal to the base edge, the spacing between the members being equal to the spacing between the upper mast section openings and adapted to be detachably received therein to retain the pennant removably secured to the mast, the members being formed of a resilient material, the members being of an elongated cylindrical shape, each member having one end thereof permanently mounted to the pennant base edge with the opposite end terminating in an enlarged diameter greater than the diameter of the openings in the upper mast section, the members being provided intermediate their respective ends with a diameter of reduced cross-section less than the diameter of the upper mast section openings, the members each having a diametric disposed slot extending longitudinally along their axis through the enlarged diameter end portion and the intermediate central portion, the slot being of a thickness permitting the opposite ends of the end portions of each member to be resiliently deflected inwardly toward each other for insertion axially into the associated upper mast section opening after which the opposite ends again separate to retain the intermediate reduced area central portion in contact with the edges of the opening and the enlarged opposite end removably retained within the interior of the upper mast section whereby the pennant is thus detachably attached to the upper mast section for signaling purposes.

2. A warning device intended for permanent mounting on the body of a vehicle, such as an automobile, in a substantially concealed inoperative position and adapted for utilization in an operable position disposed at an elevation substantially higher than the top of the passenger compartment of the vehicle, comprising:

an upright longitudinally elongated hollow open ended cylindrical support tube having an open top end and an open bottom end, the top end adapted to be mounted to the body of the automobile below an exterior portion thereof and axially aligned with an opening provided therefor in the automobile body with the support tube positioned in a substantially vertical manner, the support tube having an elongated cylindrical compartment extending axially completely therethrough between the respective ends thereof;

mounting means associated with said support tube top end for affixing said tube to said vehicle body, said mounting means including a flat washer affixed to the tube top end concentric with the tube to define an annular shoulder thereabout for engaging the interior of the vehicle body to secure the tube thereto;

a telescopic mast axially positioned within the support tube and telescopic relative thereto between a retracted inoperative position in which it is completely concealed from sight within the support tube, and an operative display position in which it is extended telescopically from the support tube with the top end thereof projecting a substantial height above the automobile passenger compartment roof surface, the telescoping mast consisting of at least three longitudinally elongated hollow cylindrical mast sections each having a different interior and exterior diameter, the lower section having an exterior diameter of a size to be slidably telescopically received for reciprocal movement within the support tube compartment through the top end thereof, the intermediate section being of a diameter to be telescopically received within the lower section through its top end, and the upper section being of a diameter to be telescopically received within the intermediate section through its top end, the collapsed telescoped position of the sections all being completely contained within the support tube compartment in the inoperative position;

a disc shaped base mounted to the top end of the mast upper section normal to the axis of the mast, the base completely covering the vehicle body opening when resting on the vehicle body when the mast is in the collapsed inoperative position;

an electric lamp socket mounted centrally of the base and extending upwardly therefrom;

an electric lamp removably received in the socket for energization thereby to provide a visible warning light signal;

a light transmitting dome shaped transparent protective cover surrounding the lamp and socket and removably secured to the top surface of the base about the periphery thereof;

a pair of suitably insulated electrical wires attached to the socket and passing downwardly therefrom through all of the mast section and through the supporting tube to be connected to the electrical circuit of the vehicle to permit selective energization and de-energization of the lamp;

a rigid triangularly shaped pennant signaling member having a base edge and an apex and forming a visible signal to be detachably attached along its base edge to the side wall of the upper mast section and extend laterally outwardly therefrom for visibility to oncoming traffic approaching the vehicle;

a pair of longitudinally spaced apart parallelly aligned radially disposed openings located along a side wall of the upper mast section and extending into the hollow interior thereof;

a pair of projecting members resiliently retained within said upper mast section openings and reciprocally movable therein between an inoperative position completely retained within said mast and an operative position projecting outwardly from said mast normal to the axis thereof;

a spring member associated with each projecting member and resiliently biasing the same in a direction outwardly of said mast;

a pair of identical loop shaped members affixed to the opposite ends of the pennant base edge and projecting outwardly therefrom in the plane of the pennant and normal to the base edge thereof, the spacing between the loop members being equal to the spacing between the projecting members of the upper mast section, the members each being of a size and configuration to be detachably attached to the associated projection to detachably retain the pennant removably mounted to the mast for signaling purposes.

* * * * *